(12) United States Patent
Rider et al.

(10) Patent No.: US 10,334,899 B2
(45) Date of Patent: Jul. 2, 2019

(54) WEARABLE ADAPTIVE ELECTROACTIVE POLYMER FABRIC

(71) Applicant: Intel Corporation, Santa Clara, CA (US)

(72) Inventors: Tomer Rider, Naahryia (IL); Shahar Taite, Kfar Saba (IL)

(73) Assignee: Intel Corporation, Santa Clara, CA (US)

( * ) Notice: Subject to any disclaimer, the term of this patent is extended or adjusted under 35 U.S.C. 154(b) by 253 days.

(21) Appl. No.: 15/282,426

(22) Filed: Sep. 30, 2016

(65) Prior Publication Data

US 2018/0092415 A1 Apr. 5, 2018

(51) Int. Cl.
| | | |
|---|---|---|
| *A41D 31/00* | (2019.01) | |
| *D03D 1/00* | (2006.01) | |
| *G06F 3/01* | (2006.01) | |
| *A41D 13/005* | (2006.01) | |
| *D03D 15/00* | (2006.01) | |
| *A41D 31/08* | (2019.01) | |
| *A41D 31/06* | (2019.01) | |
| *A41D 13/002* | (2006.01) | |

(52) U.S. Cl.
CPC ....... *A41D 31/0033* (2013.01); *A41D 13/005* (2013.01); *A41D 31/06* (2019.02); *A41D 31/08* (2019.02); *D03D 1/0088* (2013.01); *D03D 15/00* (2013.01); *G06F 3/016* (2013.01); *A41D 13/002* (2013.01); *A41D 2400/12* (2013.01); *D10B 2201/02* (2013.01); *D10B 2401/18* (2013.01)

(58) Field of Classification Search
CPC ..... G06F 3/016; A41D 31/00; A41D 31/0022; A41D 31/0033; D03D 1/0088; Y10S 428/913; Y10T 428/24273
See application file for complete search history.

(56) References Cited

U.S. PATENT DOCUMENTS

| 6,080,690 A | 6/2000 | Lebby et al. |
| 7,233,829 B2 | 6/2007 | Vlad |

(Continued)

FOREIGN PATENT DOCUMENTS

| WO | WO-2004107831 A2 | 12/2004 |
| WO | WO-2012060524 A1 | 5/2012 |
| WO | 2018063908 | 4/2018 |

OTHER PUBLICATIONS

"International Application Serial No. PCT/US2017/052648, International Search Report dated Jan. 9, 2018", 3 pgs.

(Continued)

*Primary Examiner* — Andrew W Bee
(74) *Attorney, Agent, or Firm* — Schwegman Lundberg & Woessner, P.A.

(57) ABSTRACT

A smart fabric may include a smart material such as an Electroactive Polymer (EAP). An adaptive garment formed from the smart fabric may change textile density based on user needs, sensor states, context, and other inputs. In various embodiments, the EAP enables the adaptive garment to change textile density based on a sport or activity, based on calendar or scheduled events, or based on user preferences. In various embodiments, these smart fabrics may be implemented in sporting garments, uniforms, multiple-day clothing (e.g., for travel or military usage), furniture fabric, curtains, or other implementations.

25 Claims, 7 Drawing Sheets

(56) References Cited

U.S. PATENT DOCUMENTS

| | | | |
|---|---|---|---|
| 8,665,241 | B2 | 3/2014 | Heubel et al. |
| 8,684,924 | B2 | 4/2014 | Ouwerkerk et al. |
| 9,756,604 | B1* | 9/2017 | Levesque ................. G08B 6/00 |
| 2002/0124295 | A1 | 9/2002 | Fenwick et al. |
| 2006/0122544 | A1 | 6/2006 | Ciluffo |
| 2013/0344761 | A1 | 12/2013 | Williams |
| 2014/0180624 | A1 | 6/2014 | Nikonov et al. |
| 2016/0046294 | A1* | 2/2016 | Lee ....................... B60W 40/08 340/576 |
| 2016/0278444 | A1 | 9/2016 | Jordan et al. |

OTHER PUBLICATIONS

"International Application Serial No. PCT/US2017/052648, Written Opinion dated Jan. 9, 2018", 9 pgs.

"Project Jacquard", [Online]. [Accessed Oct. 13, 2017]. Retrieved from the Internet: <URL: https://atap.google.com/jacquard/about/>, (Mar. 29, 2015), 9 pgs.

"Smart fabric provides "air conditioning" for the wearer—adjustable with a mobile app", VTT, (Nov. 5, 2015), 4 pgs.

Appelson, Nate, et al., "Smart Shoe Design: Adaptable Shoe for Foot Pronation", (2015), 1 pg.

Ashley, Steven, "Artificial Muscles", Scientific American, [Online]. Retrieved from the Internet: http://ndeaa.jpl.nasa.gov/nasa-nde/nde-aa-l/clipping/Scientific-Ameican-article-Oct-03.pdf, (Oct. 2003), 8 pgs.

Huang, Gregory T., "Electroactive Polymers", MIT Technology Review, [Online]. Retrieved from the Internet: <URL: http://www.technologyreview.com/article/401750/electroactive-polymers/, (Dec. 1, 2002), 5 pgs.

* cited by examiner

WEARABLE ADAPTIVE ELECTROACTIVE POLYMER FABRIC

TECHNICAL FIELD

Embodiments described herein generally relate to wearable electronic devices.

BACKGROUND

One of the purposes of clothing is to regulate a wearer's body temperature based on the current ambient temperature. However, existing solutions for regulating temperature by clothing includes selecting or changing one or more articles of clothing, or includes modifying an article of clothing (e.g., using buttons, zippers, etc.) according to weather conditions.

There is an increasing demand for clothing that includes electronic components, or "smart clothing." Some existing solutions for smart clothing include integration of light-emitting diodes (LEDs) and similar technologies for beautifications. It is desirable to provide improved uses for regulating temperature using smart clothing.

DESCRIPTION OF EMBODIMENTS

A technical problem faced by smart clothing is providing a user experience that responds to external triggers. Technical solutions described herein include incorporating "smart materials" such as Electroactive Polymers (EAP) into a "smart fabric," which is able to change textile density based on user needs, sensor states, context, and other inputs. In various embodiments, the EAP textile (e.g., adaptive fiber) enables the smart fabric to change textile density based on a sport or activity, based on calendar or scheduled events, or based on user preferences. In various embodiments, these smart fabrics may be implemented in sporting garments, uniforms, multiple-day clothing (e.g., for travel or military usage), furniture fabric, curtains, or other implementations.

The following description and the drawings sufficiently illustrate specific embodiments to enable those skilled in the art to practice them. Other embodiments may incorporate structural, logical, electrical, process, and other changes. Portions and features of various embodiments may be included in, or substituted for, those of other embodiments. Embodiments set forth in the claims encompass all available equivalents of those claims.

Figure 1:
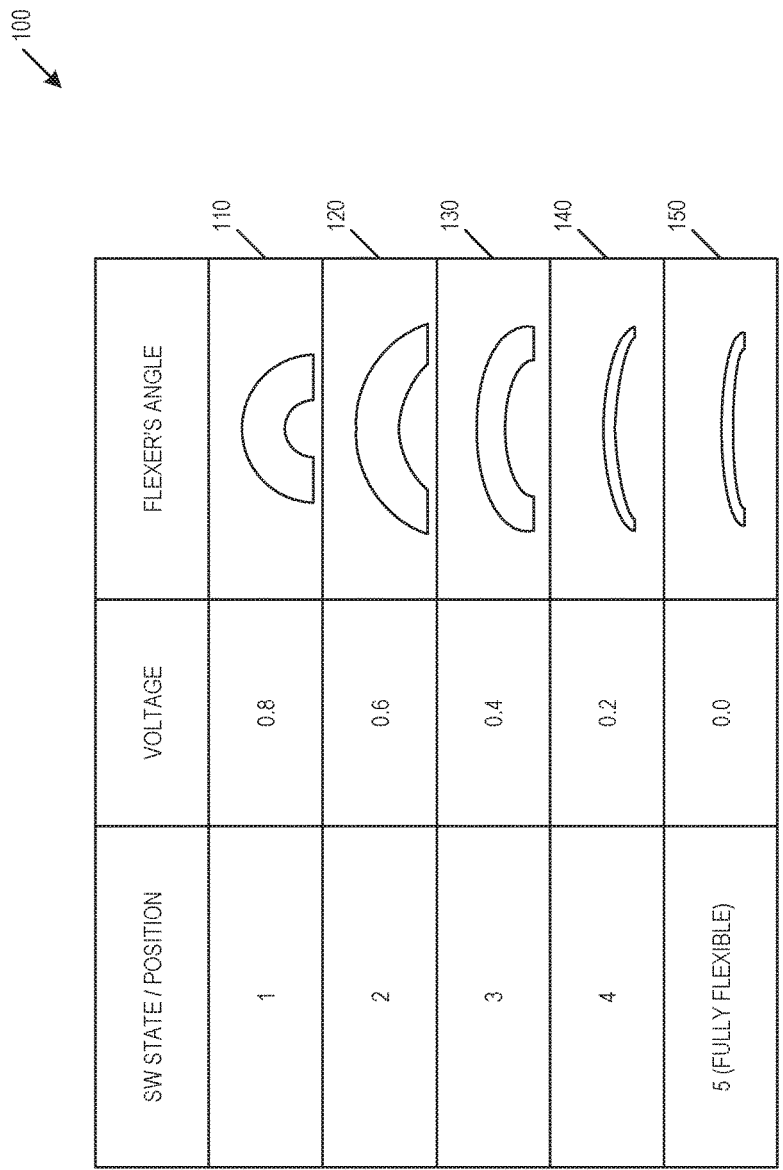
FIG. 1 is a block diagram of an EAP fiber voltage response, in accordance with at least one embodiment of the invention.

FIG. 1 is a block diagram of an EAP fiber voltage response 100, in accordance with at least one embodiment of the invention. Voltage response 100 includes five example states for the EAP fibers. In the first state 110, a voltage of at least 0.8 volts causes a maximum contraction in each EAP fiber. In the fifth state 150, a voltage of 0.0 volts causes no contraction in each EAP fiber, resulting in a fully relaxed EAP fiber. Between the maximum and minimum are the second state 120, the third state 130, and the fourth state 140, which correspond to voltages of 0.6 volts, 0.4 volts, and 0.2 volts respectively. The particular voltage may depend on the type of EAP fiber used, and may include fewer than five states or more than five states. In various embodiments, a voltage may be held constant and a current may be varied to cause the EAP fibers to contract. Various combinations of voltage and current may be used to cause the adaptive garment to achieve a desired level of contraction.

Using the various contraction levels shown in the voltage response 100, the EAP fibers enable an adaptive garment to change a textile density or garment structure, such as by opening or closing of micro holes within the fabric. The change in structure or density enables the adaptive garment to provide an improved user experience in various environments. For example, the change in density may allow the garment to "breathe" (e.g., increase transfer of air or water vapor). The change in density may also enable improved control over how tightly the adaptive garment fits the user. In various embodiments, the changed structure or density may be in response to the current weather, or may be adjusted based on personal preferences. In an example, the adaptive garment may be purchased based on a size provided by the fully relaxed EAP fibers, and the user may later apply a voltage to the adaptive garment to provide a specific size or comfort level. The EAP fibers may also be configured to provide a specific fabric pattern in a relaxed state, and the desired pattern may be adjusted based on a contraction of the EAP fibers. The EAP fibers may be integrated with non-EAP fibers, such as shown in FIG. 2.

Figure 2:
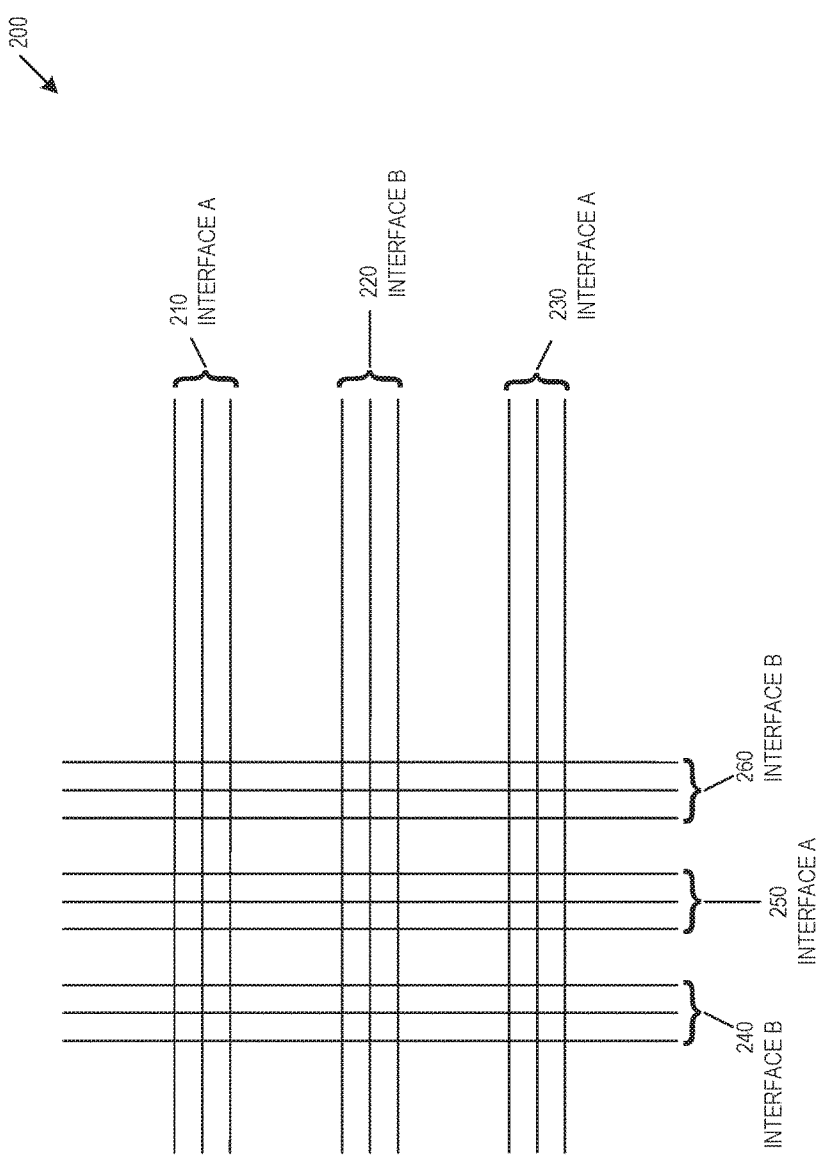
FIG. 2 is a block diagram of an EAP textile interface configuration, in accordance with at least one embodiment of the invention.

FIG. 2 is a block diagram of an EAP textile interface configuration 200, in accordance with at least one embodiment of the invention. EAP textile interface configuration 200 includes multiple adaptive fiber interfaces. Each adaptive fiber interface may be used to apply an adaptive fiber control input (e.g., input waveform signal, input voltage, input current) to an EAP fiber or to a bundle of EAP fibers to change a textile density or garment structure, such as by opening or closing of micro holes within the fabric. In an embodiment, a particular EAP fiber may be woven back and forth within an adaptive garment, and a single adaptive fiber interface may be connected to that EAP fiber. In another embodiment, single adaptive fiber interface may be connected to multiple EAP fibers. Because a single adaptive fiber interface may be connected to multiple EAP fibers, a minimum of one adaptive fiber interface is required. For more complex configurations, two or more adaptive fiber interfaces may be used. As shown in FIG. 2. EAP textile interface configuration 200 includes multiple EAP fibers that may be alternatingly connected to two adaptive fiber interfaces, adaptive fiber interface A and adaptive fiber interface B. For example, adaptive fiber interface A may be connected to a first EAP fiber 210, to a third EAP fiber 230, and to a fifth EAP fiber 250. Similarly, an adaptive fiber interface B may be connected to a second EAP fiber 220, to a fourth EAP fiber 240, and to a sixth EAP fiber 260. The use of two or more interface points enables various applications of the input, which may be used to provide various configurations of the adaptive garment based on the scenario and the use. For example, application of a larger current or larger voltage may result in a more substantial contraction of the EAP fiber, allowing greater control over adjusting the constriction of the adaptive garment. In an embodiment, the one or more interfaces are located in a location that provides access to EAP fiber end points while being unobtrusive, such as at the bottom of a shirt.

Figure 3:
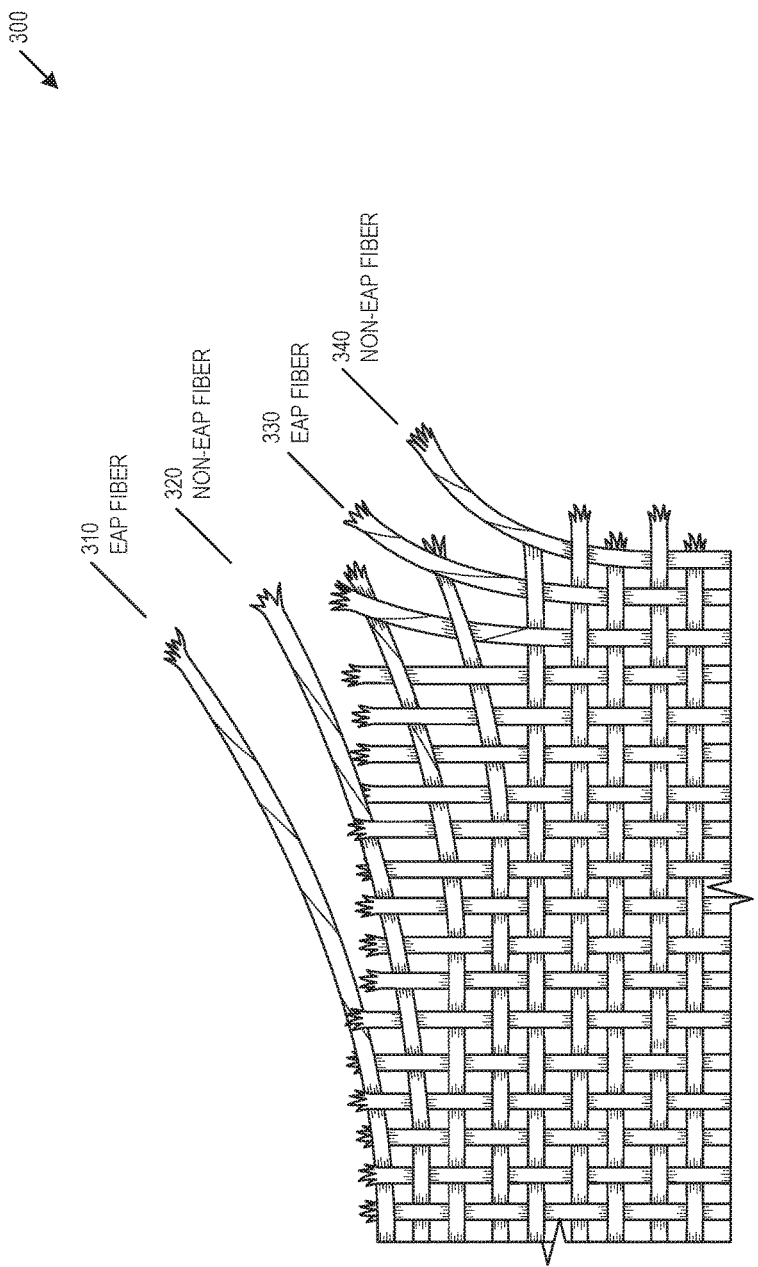
FIG. 3 is a block diagram of a first EAP weave pattern, in accordance with at least one embodiment of the invention.

FIG. 3 is a block diagram of a first EAP weave pattern 300, in accordance with at least one embodiment of the invention. The first EAP weave pattern 300 includes alternating EAP fibers and non-EAP fibers (e.g., cotton fibers), such as EAP fiber 310, non-EAP fiber 320, EAP fiber 330, and non-EAP fiber 340. The combination of EAP fibers and non-EAP fibers provides a hybrid fabric that provides both comfort and adaptive EAP technology. While first EAP weave pattern 300 shows alternating fibers, various EAP fiber configurations may be used. For example, a specific EAP fiber configuration may be used to provide increased constriction, or may be used to change the shape of a portion of an adaptive garment. The non-EAP fibers may also be used to retain a shape following application of an adaptive fiber control input to EAP fibers. For example, a voltage or current may cause EAP fibers to constrict, and non-EAP fibers may be selected or arranged to maintain the EAP fibers in the constricted structure in the absence of the voltage or current. The non-EAP fibers may be arranged to retain the constricted structure for a specific duration. For example, the constricted structure may be retained for the expected duration of an athletic activity. The constricted structure may be used to reduce power requirements. For example, instead of requiring an applied voltage to implement a desired constricted structure, a voltage may be applied periodically to EAP fibers using a predetermined duty cycle, where the voltage may be applied after a predetermined duration or when the adaptive garment detects a significant deviation from the desired constricted structure. In an embodiment, different types of EAP fibers and non-EAP fibers are used to change between a first structure and a second structure. For example, a voltage may be applied to a first EAP fiber to cause a portion of an adaptive garment to constrict, non-EAP fibers may retain the constricted structure, and a voltage may be applied to a second EAP fiber to cause the adaptive garment to return to a non-constricted (e.g., relaxed) structure.

Figure 4:
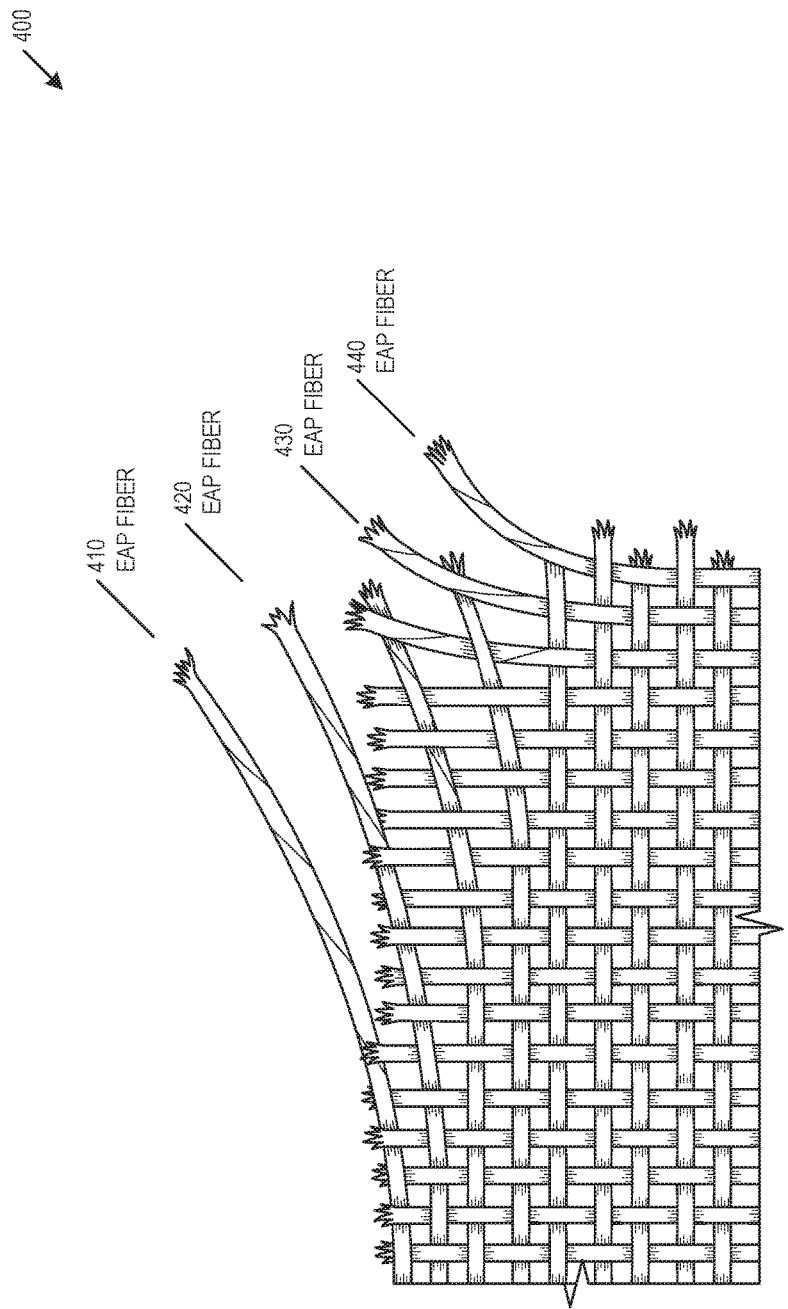
FIG. 4 is a block diagram of a second EAP weave pattern, in accordance with at least one embodiment of the invention.

FIG. 4 is a block diagram of a second EAP weave pattern 400, in accordance with at least one embodiment of the invention. The second EAP weave pattern 400 includes multiple EAP fibers, such as EAP fibers 410, 420, 430, and 440. By using only EAP fibers, the resulting adaptive garment may exhibit increased ability to constrict or relax. In another embodiment, each of the EAP fibers 410, 420, 430, and 440 are within the center of a hollow-core woven non-EAP fiber. This coaxial configuration provides the texture of the non-EAP fibers while providing the electroactive structure of the EAP fibers. The second EAP weave pattern 400 may be included in an entire adaptive garment, or may be included in a portion of the adaptive garment. For example, a shirt may use the second EAP weave pattern 400 in a lower portion of a shirt, which may be used to allow a looser fit when dressing and a tighter fit during an athletic activity. The second EAP fiber weave pattern 400 may be used to constrict a portion of an adaptive garment to improve a sensor reading. For example, a band may be formed from EAP fibers around the rib cage of a user, and the EAP fibers may be used to improve the contact of an embedded heart rate sensor with the rib cage. The second EAP fiber weave pattern 400 may be used to reduce power consumption through power harvesting. For example, a portion of an adaptive garment may include the higher-density second EAP fiber weave pattern 400, and may be used to generate power in response to a user movement. The power may be applied to a power storage unit for temporary storage, and the power may subsequently be applied from the power storage unit as an adaptive fiber control input to an EAP fiber within the adaptive garment.

Figure 5:
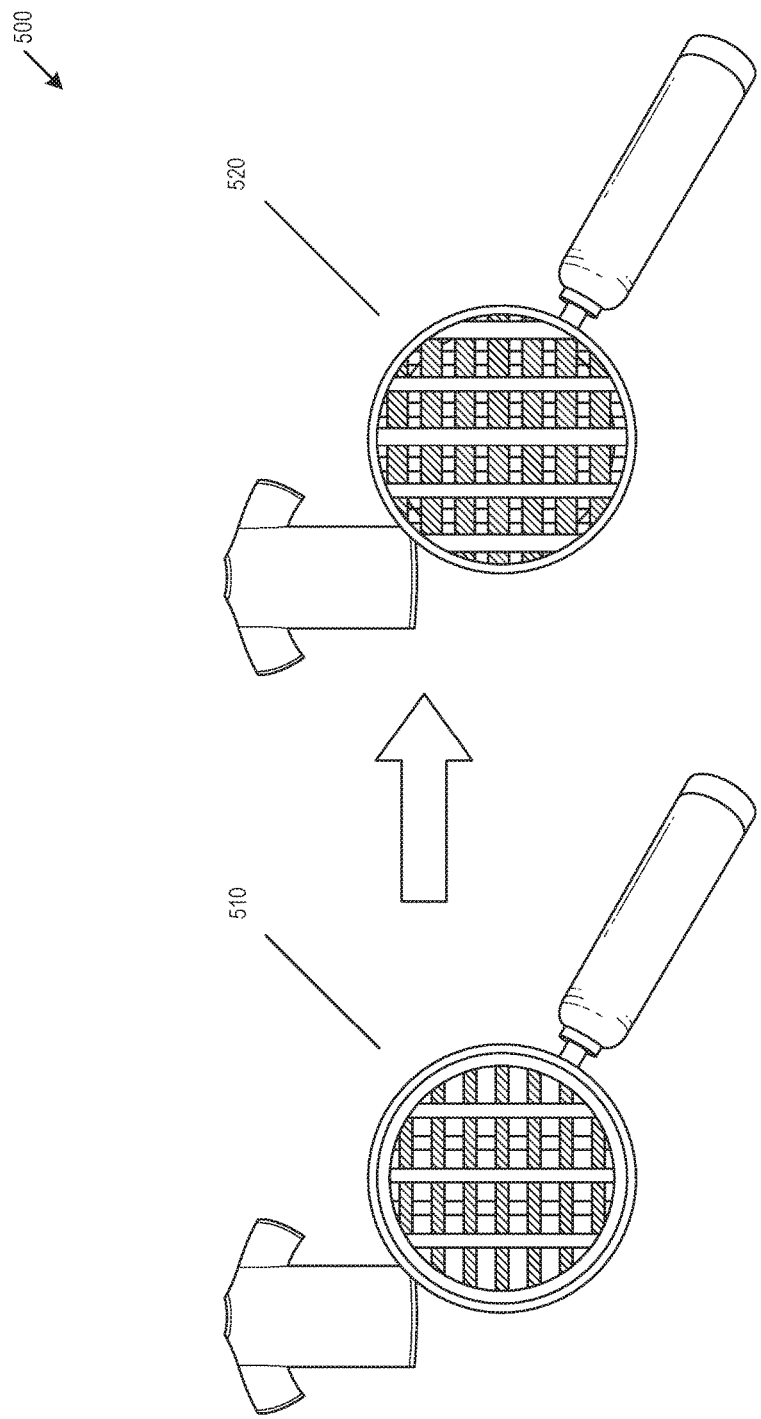
FIG. 5 is a block diagram of an adaptive garment density change, in accordance with at least one embodiment of the invention.

FIG. 5 is a block diagram of an adaptive garment density change 500, in accordance with at least one embodiment of the invention. An adaptive garment may be in a first, relaxed EAP fiber state 510, such as when no adaptive fiber control input is applied to EAP fibers. The adaptive garment may transition to a second, constricted EAP fiber state 520, such as when a adaptive fiber control input is applied to EAP fibers. This density change 500 may include closing micro holes within the fabric density, such as when transitioning between the relaxed EAP fiber state 510 and the constricted EAP fiber state 520. In various embodiments, density change 500 may be implemented using the first EAP weave pattern 300, the second EAP weave pattern 400, or a combination of both. Similarly, the EAP fibers may be woven in opposite directions into the adaptive garment to increase the ability of the adaptive garment to enlarge or close the micro holes within the fabric density.

Figure 6:
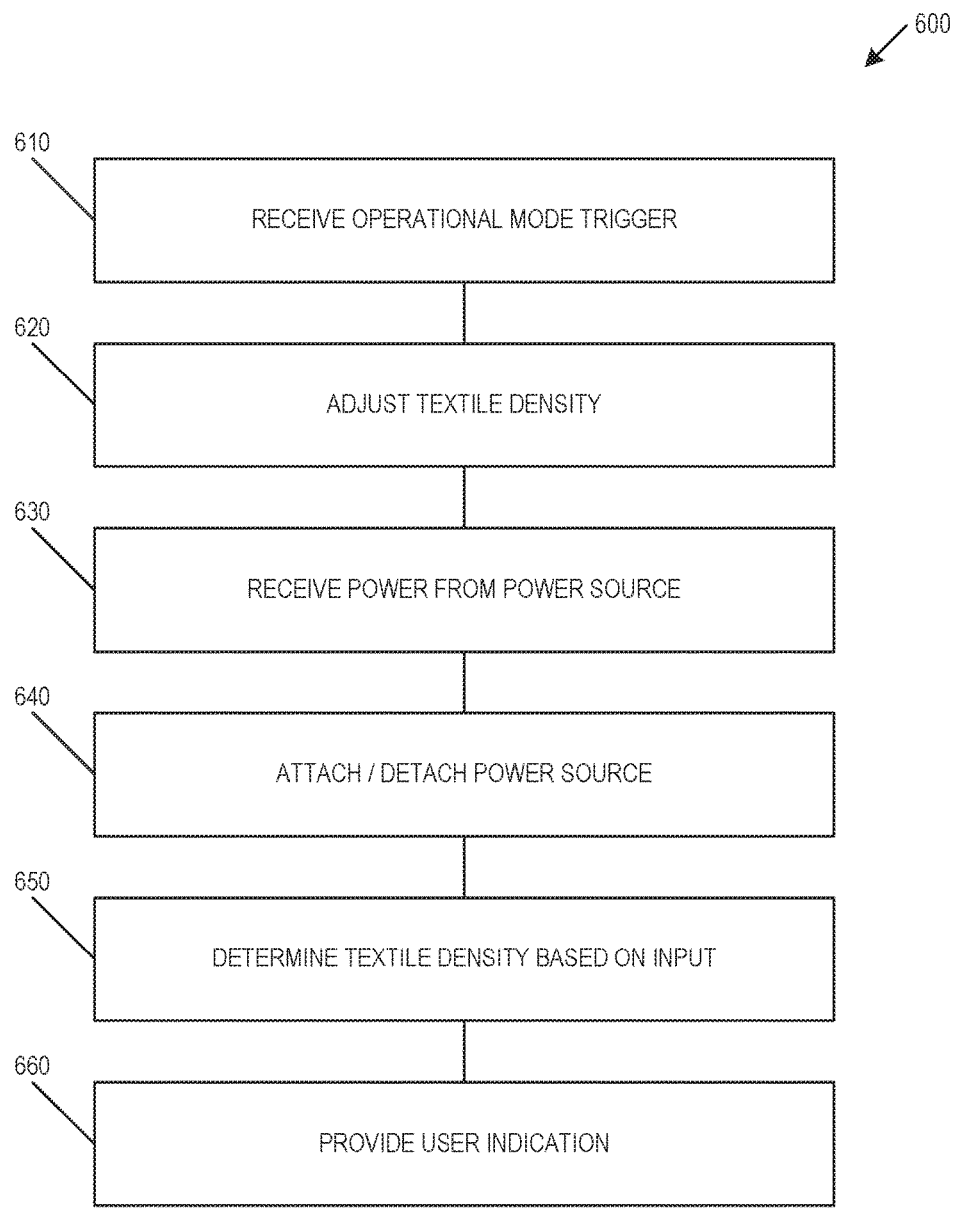
FIG. 6 is a block diagram illustrating method for adjusting textile density for an adaptive garment, in accordance with at least one embodiment of the invention.

FIG. 6 is a block diagram illustrating method 600 for adjusting textile density for an adaptive garment, in accordance with at least one embodiment of the invention. Method 600 includes receiving an operational mode trigger 610 at an adaptive garment worn by a user. The operational mode trigger may be received from a user input device, the garment including the user input device. The user input device may include a touch-sensitive input. The user input device may include a near-field communication (NFC) tag reader. The adaptive garment includes a wearable adaptive fiber that contracts in response to an applied adaptive fiber control input, where the wearable adaptive fiber is woven into the adaptive garment. Method 600 includes adjusting a textile density 620 of the wearable adaptive fabric in response to the operational mode trigger. Method 600 may further include receiving the applied adaptive fiber control input 630 from a power source. Method 600 may further include attaching a removable power source 640 to a power interface prior to adjusting the textile density, and detaching the power source after adjusting the textile density.

In an embodiment, the operational mode trigger is received from an electronic device. The electronic device may include an adaptive fabric control device, a smartphone, a wearable fitness tracker, or other electronic device, The received operational mode trigger may indicate a user preference input, such as a user preference input received on the electronic device from the user. Method 600 may include determining a textile density preference value based on the user preference input 650, wherein adjusting the textile density may be based on the textile density preference value. The user preference value may be used to provide a temporary constriction of the adaptive garment for a particular activity, such as a tighter fit during an activity. The user preference value may be used to provide a change in size of the adaptive garment. For example, an adaptive garment may be purchased in a certain size, and the adaptive garment size may be adjusted by the user for comfort or to accommodate a decrease or increase in body measurements. The user preference input may include a sliding value between a minimum textile density value and a maximum textile density value. Determining the textile density value may include quantizing the sliding value to a quantized textile density value. The minimum textile density value may include an associated minimum voltage, and similarly, the maximum textile density value may include an associated maximum voltage, where the minimum voltage and the maximum voltage may be determined based on the wearable adaptive fiber.

The operational mode trigger may indicate an event-based trigger, such as a schedule indication (e.g., calendar indication) or a time-based indication. The operational mode trigger may cause the adaptive garment to constrict or loosen to coincide with a start or end time of a schedule indication or time-based indication. This change in adaptive clothing may provide a desired clothing characteristic for the calendar event or time-based indication, such as retention of body heat during a scheduled outdoor sporting activity. This change in adaptive clothing may also provide a reminder (e.g., alarm, alert) for the calendar event or time-based indication, such as constriction of an adaptive garment to remind the user to leave the office or to go outside to run.

The schedule indication may be based on a start time or stop time of a previously scheduled event. In an example, the adaptive garment may be scheduled to provide a constricted fit during working hours, and provide a less constrictive fit (i.e., relaxed fit) after working hours. In another example, the adaptive garment may be scheduled to provide a constricted fit during activities that require an increased performance, such as during a running race, during a work meeting or presentation, or during a public speech. In another example, the adaptive garment may be scheduled to provide a constricted fit during scheduled meal times or social events to encourage the user to moderate eating or drinking.

The time-based indication may include a one-time event, such as coinciding with a scheduled reminder to complete an errand at a certain time. The time-based event may be based on an elapsed time without the occurrence of an activity, such as a temporary constriction of an adaptive garment when the user has been sedentary for more than a predetermined sedentary threshold time. The time-based event may be based on a specific time, such as providing a constriction of an adaptive garment during a user's commuting time window. The time-based event may be based on a predictable but variable time of day, such as a variable time indicating a time for the current day of dusk, sunset, or a transition between day and night (i.e., a semi-diurnal indication).

The operational mode trigger may be based on location. The location trigger may be based on a transition between an indoor location and an outdoor location. The location trigger may be based on crossing a predetermined geo-fence, where the predetermined geo-fence includes a previously defined virtual perimeter for a geographic area. The location trigger may be based on a wireless connection or disconnection, such as disconnecting from a home Wi-Fi network or connecting to a work Wi-Fi network. The location trigger may be based on a predetermined direction or path, such as connecting to a series of Wi-Fi networks that indicate the user is commuting from home to work.

The operational mode trigger may indicate an electronic device weather indication. For example, the adaptive garment may constrict to retain body heat when a temperature is below a cold temperature threshold. The operational mode trigger may be based on a combination of weather, activity, location, and other triggers. For example, the adaptive garment may constrict to retain body heat when a temperature is below a cold temperature threshold and when the user leaves a designated home location.

The operational mode trigger may be based on a sport activity, where the sport activity indication may be based on a sporting activity detected by an inertial sensor within the mobile electronic device. For example, the adaptive garment may allow for increased breathability upon detecting a sporting activity, and may constrict in response to detecting a temperature that is below an active cold temperature threshold.

In an embodiment, the operational mode trigger is received from a connected sensor. The connected sensor may be embedded within the adaptive garment. The connected sensor may be in wireless communication with the adaptive garment. The connected sensor may include a barometer to detect a barometric pressure value, where the barometer may provide a weather change indication. The connected sensor may include a galvanic sensor to detect an electrical characteristic of the user's skin, such as detecting a skin conductance value, where the received operational mode indicates an electrical characteristic change. The electrical characteristic change may indicate a user physical activity change. The electrical characteristic change may indicate a user emotional response, where the emotional response may include at least one of a startle response, an orienting response, a tear emotion, and an anger emotion. In response to the electrical characteristic change, adjusting the textile density 620 may include contracting at least a portion of the adaptive garment to increase a pressure on a part of a user's body or relaxing at least a portion of the adaptive garment.

The connected sensor may include an inertial measurement sensor to detect an athletic activity, where the operational mode trigger indicates an athletic activity change. The inertial measurement sensor may include an accelerometer, a gyroscope, a magnetometer, or other inertial sensor. The inertial measurement sensor may be configured to detect an athletic activity level change, such as an increase in physical activity. In response to the increase in physical activity, adjusting the textile density may include contracting at least a portion of the adaptive garment. The connected sensor may include an external temperature sensor to detect an ambient temperature, where the operational mode trigger may indicate an ambient temperature change, which may result in adjusting the textile density of the wearable adaptive fabric. The connected sensor further may include a body temperature sensor to detect a body temperature. The textile density may be adjusted based on the difference between the ambient temperature and the body temperature.

Method 600 may further include providing a user indication 660. The user indication may include providing a status to the user. The user indication may be provided on a display, using a light indication, using a vibration indication, or using another indication. The user indication may indicate a trigger type associated with the received operational mode trigger, such as a schedule trigger or a weather trigger. The user indication may indicate a textile density value, such as using a display, a bar of LEDs, or another textile density indication.

Figure 7:
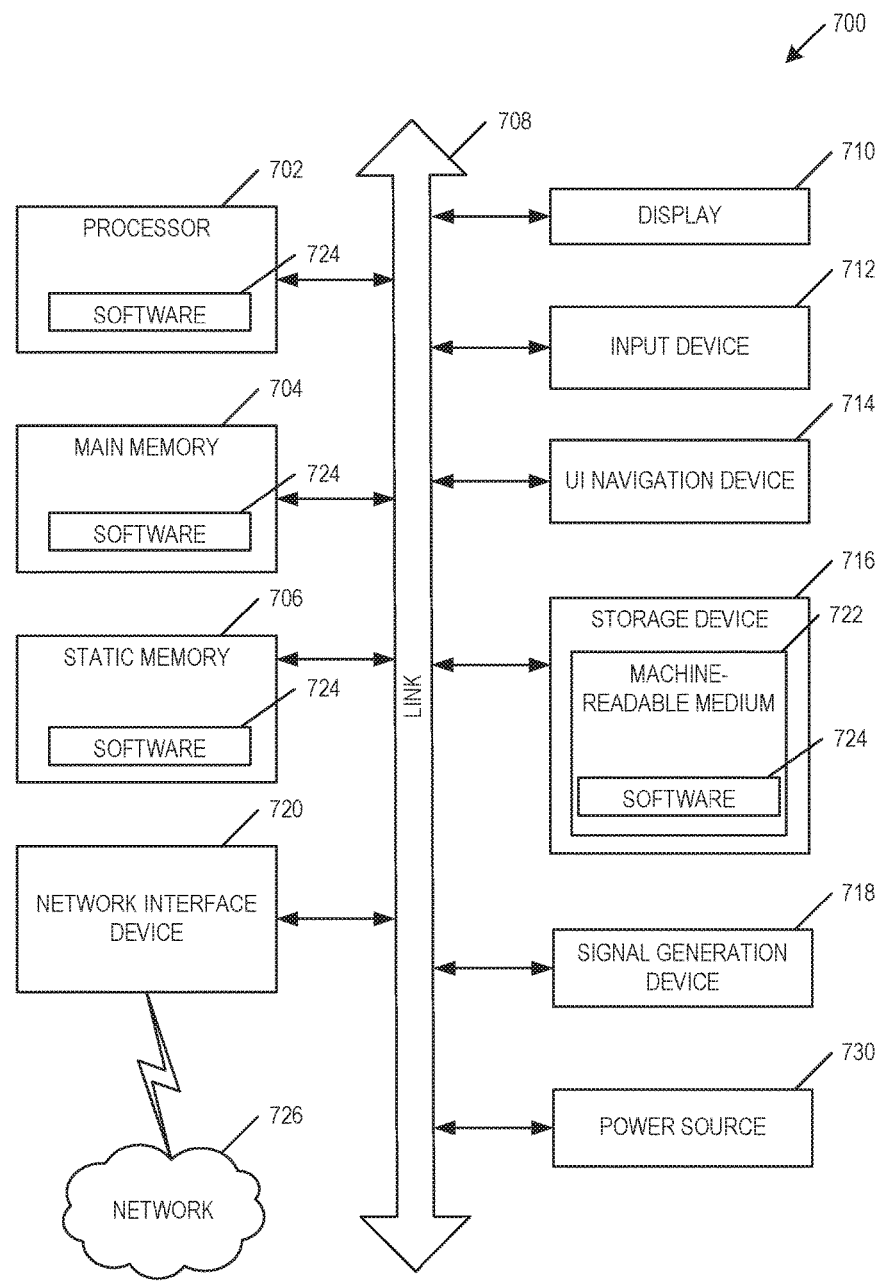
FIG. 7 is a block diagram illustrating an adaptive garment control interface in the example form of an electronic device, according to an example embodiment.

FIG. 7 is a block diagram illustrating an adaptive garment control interface in the example form of an electronic device 700, within which a set or sequence of instructions may be executed to cause the machine to perform any one of the methodologies discussed herein, according to an example embodiment. Electronic device 700 may also represent the devices shown in FIGS. 1-2. In alternative embodiments, the electronic device 700 operates as a standalone device or may be connected (e.g., networked) to other machines. In a networked deployment, the electronic device 700 may operate in the capacity of either a server or a client machine in server-client network environments, or it may act as a peer machine in peer-to-peer (or distributed) network environments. The electronic device 700 may be an integrated circuit (IC), a portable electronic device, a personal computer (PC), a tablet PC, a hybrid tablet, a personal digital assistant (PDA), a mobile telephone, or any electronic device 700 capable of executing instructions (sequential or otherwise) that specify actions to be taken by that machine to detect a user input. Further, while only a single electronic device 700 is illustrated, the terms "machine" or "electronic device" shall also be taken to include any collection of machines or devices that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to execute instructions, individually or jointly, to perform any one or more of the methodologies discussed herein.

Example electronic device 700 includes at least one processor 702. (e.g., a central processing unit (CPU), a graphics processing unit (GPU) or both, processor cores, compute nodes, etc.), a main memory 704 and a static memory 706, which communicate with each other via a link 708 (e.g., bus). The electronic device 700 may further include a display unit 710, where the display unit 710 may include a single component that provides a user-readable display and a protective layer, or another display type. The electronic device 700 may further include an input device 712, such as a pushbutton, a keyboard, or an NFC card reader. The electronic device 700 may additionally include a user interface (UI) navigation device 714 (e.g., a mouse or touch-sensitive input). In one embodiment, the display unit 710, input device 712 and UI navigation device 714 are incorporated into an adaptive garment. The electronic device 700 may additionally include a storage device 716, such as a drive unit. The electronic device 700 may additionally include a signal generation device 718, such as a speaker to provide an audible feedback, or one or more LEDs to provide a visual feedback. The electronic device 700 may additionally include a network interface device 720, and one or more additional sensors (not shown), such as a global positioning system (GPS) sensor, compass, accelerometer, or other sensor.

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the electronic device 700. The main memory 704, static memory 706, and the processor 702 may also constitute machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g., HTTP). Examples of communication networks include a local area network (LAN), a wide area network (WAN), the Internet, mobile telephone networks, and wireless data networks (e.g., Wi-Fi, NFC, Bluetooth, Bluetooth LE, 3G, 7G LTE/LTE-A, WiMAX networks, etc.). The term "transmission medium" shall be taken to include any intangible medium that is capable of storing, encoding, or carrying instructions for execution by the machine, and includes digital or analog communications signals or other intangible medium to facilitate communication of such software.

The electronic device 700 may additionally include a power source 730. Power source 730 may be embedded within the adaptive garment or may be removable. Power source 730 may be removable, such as to provide the ability to launder the adaptive garment or provide a temporary change in textile density. A removable power source 730 also provides the ability to wear the adaptive garment without requiring a constant connection to the power source 730. A removable power source 730 may be used in combination with a temporary power storage device. For example, a power source 730 may provide power to a flexible temporary storage device such as a lightweight and flexible capacitor, where the flexible capacitor may provide a desired adaptive fiber control input to the adaptive garment. The power source 730 may be used to store generated power. For example, a portion of an adaptive garment may be used to generate power in response to a user movement, and the power may be applied to the power source 730 for temporary storage, The stored power may subsequently be applied from the power source 730 to an EAP fiber within the adaptive garment.

To better illustrate the method and apparatuses disclosed herein, a non-limiting list of embodiments is provided here.

Example 1 is an adaptive fabric apparatus comprising: an adaptive garment capable of changing a textile density; and an adaptive fiber interface to adjust a textile density of the adaptive garment in response to an event-based trigger.

In Example 2, the subject matter of Example 1 optionally includes wherein the event-based trigger includes a schedule indication.

In Example 3, the subject matter of Example 2 optionally includes wherein: the schedule indication is based on a scheduled event start time; and the adaptive fiber interface adjusts the textile density at the scheduled event start time.

In Example 4, the subject matter of any one or more of Examples 2-3 optionally include wherein: the schedule indication is based on a scheduled event duration; and the adaptive fiber interface adjusts and retains the textile density during the scheduled event duration.

In Example 5, the subject matter of any one or more of Examples 1-4 optionally include wherein the event-based trigger includes a time-based indication.

In Example 6, the subject matter of Example 5 optionally includes wherein the time-based indication is based on an elapsed time without the occurrence of an activity.

In Example 7, the subject matter of any one or more of Examples 5-6 optionally include wherein the time-based indication is based on a time window.

In Example 8, the subject matter of any one or more of Examples 5-7 optionally include wherein the time-based indication is based on a predictable but variable time of day.

In Example 9, the subject matter of any one or more of Examples 1-8 optionally include wherein the adaptive fiber interface adjusting the textile density of the adaptive garment provides a reminder to a user of the adaptive garment of the event-based trigger.

In Example 10, the subject matter of any one or more of Examples 1-9 optionally include wherein the adaptive garment includes at least one wearable adaptive fiber and a plurality of non-adaptive textile fibers, the at least one wearable adaptive fiber to change shape in response to an applied adaptive fiber control input.

In Example 11, the subject matter of Example 10 optionally includes wherein the adaptive fiber control input includes at least one of an input waveform signal, and input voltage, and an input current.

In Example 12, the subject matter of Example 11 optionally includes a power source to provide power to the at least one wearable adaptive fiber.

In Example 13, the subject matter of Example 12 optionally includes a power interface, wherein the power source includes a removable power source, the power interface to connect to the removable power source temporarily while providing power to the at least one wearable adaptive fiber.

In Example 14, the subject matter of any one or more of Examples 1-13 optionally include an external device communication interface to communicate with an electronic device, wherein the event-based trigger is received from the electronic device.

In Example 15, the subject matter of Example 14 optionally includes wherein the electronic device includes at least one of an adaptive fabric control device, a smartphone, and a wearable fitness tracker.

In Example 16, the subject matter of any one or more of Examples 14-15 optionally include the adaptive fiber interface to adjust the textile density of the adaptive garment in response to a user preference input, the user preference input received on the electronic device from the user, In Example 17, the subject matter of Example 16 optionally includes a processor to determine a textile density preference value based on the user preference input, wherein adjusting the textile density is based on the textile density preference value.

In Example 18, the subject matter of Example 17 optionally includes wherein: the user preference input includes a sliding value between a minimum textile density value and a maximum textile density value; and the processor is further configured to quantize the sliding value to a quantized textile density value.

In Example 19, the subject matter of Example 18 optionally includes wherein: the minimum textile density value includes an associated minimum voltage; and the maximum textile density value includes an associated maximum voltage, the minimum voltage and the maximum voltage determined based on the wearable adaptive fiber.

In Example 20, the subject matter of any one or more of Examples 14-19 optionally include the adaptive fiber interface to adjust the textile density of the adaptive garment in response to a location indication.

In Example 21, the subject matter of Example 20 optionally includes wherein the location indication is based on a location transition between an indoor location and an outdoor location.

In Example 22, the subject matter of any one or more of Examples 20-21 optionally include wherein the location indication is based on crossing a predetermined geo-fence, the predetermined geo-fence defining a virtual perimeter for a geographic area.

In Example 23, the subject matter of any one or more of Examples 14-22 optionally include the adaptive fiber interface to adjust the textile density of the adaptive garment in response to a sport activity indication.

In Example 24, the subject matter of Example 23 optionally includes wherein the sport activity indication is based on a sporting activity detected by a device sensor.

In Example 25, the subject matter of any one or more of Examples 14-24 optionally include the adaptive fiber interface to adjust the textile density of the adaptive garment in response to an electronic device weather indication.

In Example 26, the subject matter of any one or more of Examples 1-25 optionally include a connected sensor to provide the event-based trigger.

In Example 27, the subject matter of Example 26 optionally includes wherein the adaptive garment further includes the connected sensor embedded within the adaptive garment.

In Example 28, the subject matter of any one or more of Examples 26-27 optionally include a wireless communication interface to communicate wirelessly with the connected sensor.

In Example 29, the subject matter of any one or more of Examples 26-28 optionally include Wherein the connected sensor includes a barometer to detect a barometric pressure value and generate a weather change indication, the adaptive fiber interface to adjust the textile density of the adaptive garment in response to the weather change indication.

In Example 30, the subject matter of any one or more of Examples 26-29 optionally include wherein the connected sensor includes a galvanic sensor to detect an electrical characteristic of the user's skin and generate an electrical characteristic change indication, the adaptive fiber interface to adjust the textile density of the adaptive garment in response to the electrical characteristic change indication.

In Example 31, the subject matter of Example 30 optionally includes wherein the electrical characteristic change indicates a user physical activity change.

In Example 32, the subject matter of any one or more of Examples 30-31 optionally include wherein the electrical characteristic change indicates a user emotional response.

In Example 33, the subject matter of Example 32 optionally includes wherein the emotional response includes at least one of a startle response, an orienting response, a tear emotion, and an anger emotion.

In Example 34, the subject matter of any one or more of Examples 32-33 optionally include wherein the adaptive fiber interface adjusting the textile density includes changing a shape of at least a portion of the adaptive garment.

In Example 35, the subject matter of any one or more of Examples 32-34 optionally include wherein the adaptive fiber interface adjusting the textile density includes relaxing at least a portion of the adaptive garment.

In Example 36, the subject matter of any one or more of Examples 26-35 optionally include wherein the connected sensor includes an inertial measurement sensor to detect an athletic activity change, the adaptive fiber interface to adjust the textile density of the adaptive garment in response to the athletic activity change.

In Example 37, the subject matter of Example 36 optionally includes wherein the inertial measurement sensor includes at least one of an accelerometer, a gyroscope, and a magnetometer.

In Example 38, the subject matter of any one or more of Examples 36-37 optionally include the inertial measurement sensor further to detect an athletic activity level change, wherein adjusting the textile density includes changing a shape of at least a portion of the adaptive garment.

In Example 39, the subject matter of any one or more of Examples 26-38 optionally include wherein the connected sensor includes an external temperature sensor to detect an ambient temperature.

In Example 40, the subject matter of Example 39 optionally includes the adaptive fiber interface to adjust the textile density of the adaptive garment in response to an ambient temperature change, wherein adjusting the textile density in response to the increase in the ambient temperature change includes adjusting the textile density of the wearable adaptive fabric.

In Example 41, the subject matter of any one or more of Examples 39-40 optionally include wherein the connected sensor further includes a body temperature sensor to detect a body temperature.

In Example 42, the subject matter of Example 41 optionally includes the processor further to determine a textile density differential temperature value based on the ambient temperature and the body temperature, wherein the adaptive fiber interface adjusting the textile density is based on the textile density differential temperature value.

In Example 43, the subject matter of any one or more of Examples 1-42 optionally include a user input device to generate a user input.

In Example 44, the subject matter of Example 43 optionally includes wherein the user input device includes a touch-sensitive input.

In Example 45, the subject matter of any one or more of Examples 43-44 optionally include wherein the user input device includes a Near-Field Communication tag reader.

In Example 46, the subject matter of any one or more of Examples 1-45 optionally include a status indicator device to provide a status feedback indication to the user.

In Example 47, the subject matter of Example 46 optionally includes wherein the status indicator includes at least one of a display device, an indicator light, and a vibration feedback device.

In Example 48, the subject matter of any one or more of Examples 46-47 optionally include wherein the status feedback indication includes a trigger type indicator to indicate a trigger type associated with the textile density of the adaptive garment.

In Example 49, the subject matter of any one or more of Examples 46-48 optionally include wherein the status feedback indication includes a textile density indicator to indicate a textile density value.

Example 50 is an adaptive fabric method comprising: receiving an event-based trigger at an adaptive garment worn by a user, the adaptive garment including a wearable adaptive fiber capable of changing a textile density of the adaptive garment; and adjusting the textile density of the wearable adaptive fabric in response to the event-based trigger.

In Example 51, the subject matter of Example 50 optionally includes wherein the event-based trigger includes a schedule indication.

In Example 52, the subject matter of Example 51 optionally includes wherein: the schedule indication is based on a scheduled event start time; and the adaptive fiber interface adjusts the textile density at the scheduled event start time.

In Example 53, the subject matter of any one or more of Examples 51-52 optionally include wherein: the schedule indication is based on a scheduled event duration; and the adaptive fiber interface adjusts and retains the textile density during the scheduled event duration.

In Example 54, the subject matter of any one or more of Examples 50-53 optionally include wherein the event-based trigger includes a time-based indication.

In Example 55, the subject matter of Example 54 optionally includes wherein the time-based indication is based on an elapsed time without the occurrence of an activity.

In Example 56, the subject matter of any one or more of Examples 54-55 optionally include wherein the time-based indication is based on a time window.

In Example 57, the subject matter of any one or more of Examples 54-56 optionally include wherein the time-based indication is based on a predictable but variable time of day.

In Example 58, the subject matter of any one or more of Examples 50-57 optionally include wherein the adaptive fiber interface adjusting the textile density of the adaptive garment provides a reminder to a user of the adaptive garment of the event-based trigger.

In Example 59, the subject matter of any one or more of Examples 50-58 optionally include wherein the adaptive garment includes at least one wearable adaptive fiber and a plurality of non-adaptive textile fibers, the at least one wearable adaptive fiber to change shape in response to an applied adaptive fiber control input.

In Example 60, the subject matter of Example 59 optionally includes wherein the adaptive fiber control input includes at least one of an input waveform signal, and input voltage, and an input current.

In Example 61, the subject matter of Example 60 optionally includes receiving the applied voltage from a power source.

In Example 62, the subject matter of Example 61 optionally includes attaching the power source to a power interface prior to adjusting the textile density, the power source including a removable power source; and detaching the power source after adjusting the textile density.

In Example 63, the subject matter of any one or more of Examples 50-62 optionally include wherein the event-based trigger is received from an electronic device.

In Example 64, the subject matter of Example 63 optionally includes wherein the electronic device includes at least one of an adaptive fabric control device, a smartphone, and a wearable fitness tracker.

In Example 65, the subject matter of any one or more of Examples 63-64 optionally include adjusting the textile density of the wearable adaptive fabric in response to a user preference input, the user preference input received on the electronic device from the user.

In Example 66, the subject matter of Example 65 optionally includes determining a textile density preference value based on the user preference input, wherein adjusting the textile density is based on the textile density preference value.

In Example 67, the subject matter of Example 66 optionally includes wherein: the user preference input includes a sliding value between a minimum textile density value and a maximum textile density value; and determining the textile density value includes quantizing the sliding value to a quantized textile density value.

In Example 68, the subject matter of Example 67 optionally includes wherein: the minimum textile density value includes an associated minimum voltage; and the maximum textile density value includes an associated maximum voltage, the minimum voltage and the maximum voltage determined based on the wearable adaptive fiber.

In Example 69, the subject matter of any one or more of Examples 63-68 optionally include adjusting the textile density of the wearable adaptive fabric in response to a location indication.

In Example 70, the subject matter of Example 69 optionally includes wherein the location indication is based on a location transition between an indoor location and an outdoor location.

In Example 71, the subject matter of any one or more of Examples 69-70 optionally include wherein the location indication is based on crossing a predetermined geo-fence, the predetermined geo-fence defining a virtual perimeter for a geographic area.

In Example 72, the subject matter of any one or more of Examples 63-71 optionally include adjusting the textile density of the wearable adaptive fabric in response to a sport activity indication.

In Example 73, the subject matter of Example 72 optionally includes wherein the sport activity indication is based on a sporting activity detected by a device sensor.

In Example 74, the subject matter of any one or more of Examples 63-73 optionally include adjusting the textile density of the wearable adaptive fabric in response to an electronic device weather indication.

In Example 75, the subject matter of any one or more of Examples 50-74 optionally include wherein the event-based trigger is received from a connected sensor.

In Example 76, the subject matter of Example 75 optionally includes wherein the connected sensor is embedded within the adaptive garment.

In Example 77, the subject matter of any one or more of Examples 75-76 optionally include wherein the connected sensor is in wireless communication with the adaptive garment.

In Example 78, the subject matter of any one or more of Examples 75-77 optionally include detecting a barometric pressure value; generating a weather change indication based on the barometric pressure value; and adjusting the textile density of the wearable adaptive fabric in response to the weather change indication.

In Example 79, the subject matter of any one or more of Examples 75-78 optionally include detecting an electrical characteristic change of the user's skin; and adjusting the textile density of the wearable adaptive fabric in response to the electrical characteristic change.

In Example 80, the subject matter of Example 79 optionally includes wherein the electrical characteristic change indicates a user physical activity change.

In Example 81, the subject matter of any one or more of Examples 79-80 optionally include wherein the electrical characteristic change indicates a user emotional response.

In Example 82, the subject matter of Example 81 optionally includes wherein the emotional response includes at least one of a startle response, an orienting response, a fear emotion, and an anger emotion.

In Example 83, the subject matter of any one or more of Examples 81-82 optionally include wherein adjusting the textile density includes changing a shape of at least a portion of the adaptive garment.

In Example 84, the subject matter of any one or more of Examples 81-83 optionally include wherein adjusting the textile density includes relaxing at least a portion of the adaptive garment.

In Example 85, the subject matter of any one or more of Examples 75-84 optionally include detecting an athletic activity change; and adjusting the textile density of the wearable adaptive fabric in response to the athletic activity change.

In Example 86, the subject matter of Example 85 optionally includes wherein the inertial measurement sensor includes at least one of an accelerometer, a gyroscope, and a magnetometer.

In Example 87, the subject matter of any one or more of Examples 85-86 optionally include the inertial measurement sensor further to detect an athletic activity level change, wherein adjusting the textile density includes changing a shape of at least a portion of the adaptive garment.

In Example 88, the subject matter of any one or more of Examples 75-87 optionally include wherein the connected sensor includes an external temperature sensor to detect an ambient temperature.

In Example 89, the subject matter of Example 88 optionally includes detecting an ambient temperature change; and adjusting the textile density of the wearable adaptive fabric in response to the ambient temperature.

In Example 90, the subject matter of any one or more of Examples 88-89 optionally include wherein the connected sensor further includes a body temperature sensor to detect a body temperature.

In Example 91, the subject matter of Example 90 optionally includes determining a textile density differential temperature value based on the ambient temperature and the body temperature, wherein adjusting the textile density is based on the textile density differential temperature value.

in Example 92, the subject matter of any one or more of Examples 50-91 optionally include receiving a user input from a user input device, the garment including the user input device.

In Example 93, the subject matter of Example 92 optionally includes wherein the user input device includes a touch-sensitive input.

In Example 94, the subject matter of any one or more of Examples 92-93 optionally include wherein the user input device includes a Near-Field Communication tag reader.

In Example 95, the subject matter of any one or more of Examples 50-94 optionally include providing a status indicator to the user, the status indicator to provide a status feedback indication to the user.

In Example 96, the subject matter of Example 95 optionally includes wherein the status indicator is provided to the user via at least one of a display device, an indicator light, and a vibration feedback device.

In Example 97, the subject matter of any one or more of Examples 95-96 optionally include wherein the status feedback indication includes a trigger type indicator to indicate a trigger type associated with the textile density of the adaptive garment.

In Example 98, the subject matter of any one or more of Examples 95-97 optionally include wherein the status feedback indication includes a textile density indicator to indicate a textile density value.

Example 99 is at least one machine-readable medium including instructions, which when executed by a computing system, cause the computing system to perform any of the methods of Examples 50-98.

Example 100 is an apparatus comprising means for performing any of the methods of Examples 50-98.

Example 101 is at least one machine-readable storage medium, comprising a plurality of instructions that, responsive to being executed with processor circuitry of a computer-controlled device, cause the computer-controlled device to: receive an event-based trigger at an adaptive garment worn by a user, the adaptive garment including a wearable adaptive fiber capable of changing a textile density of the adaptive garment; and adjust the textile density of the wearable adaptive fabric in response to the event-based trigger.

In Example 102, the subject matter of Example 101 optionally includes wherein the event-based trigger includes a schedule indication.

In Example 103, the subject matter of Example 102 optionally includes wherein: the schedule indication is based on a scheduled event start time; and the adaptive fiber interface adjusts the textile density at the scheduled event start time.

In Example 104, the subject matter of any one or more of Examples 102-103 optionally include wherein: the schedule indication is based on a scheduled event duration; and the adaptive fiber interface adjusts and retains the textile density during the scheduled event duration.

In Example 105, the subject matter of any one or more of Examples 101-104 optionally include wherein the event-based trigger includes a time-based indication.

In Example 106, the subject matter of Example 105 optionally includes wherein the time-based indication is based on an elapsed time without the occurrence of an activity.

In Example 107, the subject matter of any one or more of Examples 105-106 optionally include wherein the time-based indication is based on a time window.

In Example 108, the subject matter of any one or more of Examples 105-107 optionally include wherein the time-based indication is based on a predictable but variable time of day.

In Example 109, the subject matter of any one or more of Examples 101-108 optionally include wherein the adaptive fiber interface adjusting the textile density of the adaptive garment provides a reminder to a user of the adaptive garment of the event-based trigger.

In Example 110, the subject matter of any one or more of Examples 101-109 optionally include wherein the adaptive garment includes at least one wearable adaptive fiber and a plurality of non-adaptive textile fibers, the at least one wearable adaptive fiber to change shape in response to an applied adaptive fiber control input.

In Example 111, the subject matter of Example 110 optionally includes wherein the adaptive fiber control input includes at least one of an input waveform signal, and input voltage, and an input current.

In Example 112, the subject matter of Example 111 optionally includes the instructions further causing the computer-controlled device to receive the applied voltage from a power source.

In Example 113, the subject matter of Example 112 optionally includes the instructions further causing the computer-controlled device to: attach the power source to a power interface prior to adjusting the textile density, the power source including a removable power source; and detach the power source after adjusting the textile density.

In Example 114, the subject matter of any one or more of Examples 101-113 optionally include wherein the event-based trigger is received from an electronic device.

In Example 115, the subject matter of Example 114 optionally includes wherein the electronic device includes at least one of an adaptive fabric control device, a smartphone, and a wearable fitness tracker.

In Example 116, the subject matter of any one or more of Examples 114-115 optionally include the instructions further causing the computer-controlled device to adjust the textile density of the wearable adaptive fabric in response to a user preference input, the user preference input received on the electronic device from the user.

In Example 117, the subject matter of Example 116 optionally includes the instructions further causing the computer-controlled device to determine a textile density preference value based on the user preference input, wherein adjusting the textile density is based on the textile density preference value.

In Example 118, the subject matter of Example 117 optionally includes wherein: the user preference input includes a sliding value between a minimum textile density value and a maximum textile density value; and the instructions further causing the computer-controlled device to quantize the sliding value to a quantized textile density value.

In Example 119, the subject matter of Example 118 optionally includes wherein: the minimum textile density value includes an associated minimum voltage; and the maximum textile density value includes an associated maximum voltage, the minimum voltage and the maximum voltage determined based on the wearable adaptive fiber.

In Example 120, the subject matter of any one or more of Examples 114-119 optionally include the instructions further causing the computer-controlled device to adjust the textile density of the wearable adaptive fabric in response to a location indication.

In Example 121, the subject matter of Example 120 optionally includes wherein the location indication is based on a location transition between an indoor location and an outdoor location.

In Example 122, the subject matter of any one or more of Examples 120-121 optionally include wherein the location indication is based on crossing a predetermined geo-fence, the predetermined geo-fence defining a virtual perimeter for a geographic area.

In Example 123, the subject matter of any one or more of Examples 114-122 optionally include the instructions further causing the computer-controlled device to adjust the textile density of the wearable adaptive fabric in response to a sport activity indication.

In Example 124, the subject matter of Example 123 optionally includes wherein the sport activity indication is based on a sporting activity detected by a device sensor.

In Example 125, the subject matter of any one or more of Examples 114-124 optionally include the instructions further causing the computer-controlled device to adjust the textile density of the wearable adaptive fabric in response to an electronic device weather indication.

In Example 126, the subject matter of any one or more of Examples 101-125 optionally include wherein the event-based trigger is received from a connected sensor.

In Example 127, the subject matter of Example 126 optionally includes wherein the connected sensor is embedded within the adaptive garment.

In Example 128, the subject matter of any one or more of Examples 126-127 optionally include wherein the connected sensor is in wireless communication with the adaptive garment.

In Example 129, the subject matter of any one or more of Examples 126-128 optionally include the instructions further causing the computer-controlled device to: detect a barometric pressure value; generate a weather change indication based on the barometric pressure value; and adjust the textile density of the wearable adaptive fabric in response to the weather change indication.

In Example 130, the subject matter of any one or more of Examples 126-129 optionally include the instructions further causing the computer-controlled device to: detect an electrical characteristic of the user's skin and adjust the textile density of the wearable adaptive fabric in response to the electrical characteristic change.

In Example 131, the subject matter of Example 130 optionally includes wherein the electrical characteristic change indicates a user physical activity change.

In Example 132, the subject matter of any one or more of Examples 130-131 optionally include wherein the electrical characteristic change indicates a user emotional response.

In Example 133, the subject matter of Example 132 optionally includes wherein the emotional response includes at least one of a startle response, an orienting response, a fear emotion, and an anger emotion.

In Example 134, the subject matter of any one or more of Examples 132-133 optionally include wherein adjusting the textile density includes changing a shape of at least a portion of the adaptive garment.

In Example 135, the subject matter of any one or more of Examples 132-134 optionally include wherein adjusting the textile density includes relaxing at least a portion of the adaptive garment.

In Example 136, the subject matter of any one or more of Examples 126-135 optionally include the instructions further causing the computer-controlled device to: detect an athletic activity; and adjust the textile density of the wearable adaptive fabric in response to the athletic activity change.

In Example 137, the subject matter of Example 136 optionally includes wherein the inertial measurement sensor includes at least one of an accelerometer, a gyroscope, and a magnetometer.

In Example 138, the subject matter of any one or more of Examples 136-137 optionally include the inertial measurement sensor further to detect an athletic activity level change, wherein adjusting the textile density includes changing a shape of at least a portion of the adaptive garment.

In Example 139, the subject matter of any one or more of Examples 126-138 optionally include wherein the connected sensor includes an external temperature sensor to detect an ambient temperature.

In Example 140, the subject matter of Example 139 optionally includes the instructions further causing the computer-controlled device to: detect an ambient temperature change; and adjust the textile density of the wearable adaptive fabric based on the ambient temperature change.

In Example 141, the subject matter of any one or more of Examples 139-140 optionally include wherein the connected sensor further includes a body temperature sensor to detect a body temperature.

In Example 142, the subject matter of Example 141 optionally includes the instructions further causing the computer-controlled device to determine a textile density differential temperature value based on the ambient temperature and the body temperature, wherein adjusting the textile density is based on the textile density differential temperature value.

In Example 143, the subject matter of any one or more of Examples 101-142 optionally include the instructions further causing the computer-controlled device to receive a user input from a user input device, the garment including the user input device.

In Example 144, the subject matter of Example 143 optionally includes wherein the user input device includes a touch-sensitive input.

In Example 145, the subject matter of any one or more of Examples 143-144 optionally include wherein the user input device includes a Near-Field Communication tag reader.

In Example 146, the subject matter of any one or more of Examples 101-145 optionally include the instructions further causing the computer-controlled device to provide a status indicator to the user, the status indicator to provide a status feedback indication to the user.

In Example 147, the subject matter of Example 146 optionally includes wherein the status indicator is provided to the user via at least one of a display device, an indicator light, and a vibration feedback device.

In Example 148, the subject matter of any one or more of Examples 146-147 optionally include wherein the status feedback indication includes a trigger type indicator to indicate a trigger type associated with the textile density of the adaptive garment.

In Example 149, the subject matter of any one or more of Examples 146-148 optionally include wherein the status feedback indication includes a textile density indicator to indicate a textile density value.

Example 150 is an adaptive fabric apparatus comprising: means for receiving an event-based trigger at an adaptive garment worn by a user, the adaptive garment including a wearable adaptive fiber capable of changing a textile density of the adaptive garment; and means for adjusting a textile density of the wearable adaptive fabric in response to the event-based trigger.

In Example 151, the subject matter of Example 150 optionally includes wherein the event-based trigger includes a schedule indication.

In Example 152, the subject matter of Example 151 optionally includes wherein: the schedule indication is based on a scheduled event start time; and the adaptive fiber interface adjusts the textile density at the scheduled event start time.

In Example 153, the subject matter of any one or more of Examples 151-152 optionally include wherein: the schedule indication is based on a scheduled event duration; and the adaptive fiber interface adjusts and retains the textile density during the scheduled event duration.

In Example 154, the subject matter of any one or more of Examples 150-153 optionally include wherein the event-based trigger includes a time-based indication.

In Example 155, the subject matter of Example 154 optionally includes wherein the time-based indication is based on an elapsed time without the occurrence of an activity.

In Example 156, the subject matter of any one or more of Examples 154-155 optionally include wherein the time-based indication is based on a time window.

In Example 157, the subject matter of any one or more of Examples 154-156 optionally include wherein the time-based indication is based on a predictable but variable time of day.

In Example 158, the subject matter of any one or more of Examples 150-157 optionally include wherein the adaptive fiber interface adjusting the textile density of the adaptive garment provides a reminder to a user of the adaptive garment of the event-based trigger.

In Example 159, the subject matter of any one or more of Examples 150-158 optionally include wherein the adaptive garment includes at least one wearable adaptive fiber and a plurality of non-adaptive textile fibers, the at least one wearable adaptive fiber to change shape in response to an applied adaptive fiber control input.

In Example 160, the subject matter of Example 159 optionally includes wherein the adaptive fiber control input includes at least one of an input waveform signal, and input voltage, and an input current.

In Example 161, the subject matter of Example 160 optionally includes means for receiving the applied voltage from a power source.

In Example 162, the subject matter of Example 161 optionally includes means for attaching the power source to a power interface prior to adjusting the textile density, the power source including a removable power source; and means for detaching the power source after adjusting the textile density.

In Example 163, the subject matter of any one or more of Examples 150-162 optionally include wherein the event-based trigger is received from an electronic device.

In Example 164, the subject matter of Example 163 optionally includes wherein the electronic device includes at least one of an adaptive fabric control device, a smartphone, and a wearable fitness tracker.

In Example 165, the subject matter of any one or more of Examples 163-164 optionally include means for adjusting the textile density of the wearable adaptive fabric in response to a user preference input, the user preference input received on the electronic device from the user.

In Example 166, the subject matter of Example 165 optionally includes means for determining a textile density preference value based on the user preference input, wherein adjusting the textile density is based on the textile density preference value.

In Example 167, the subject matter of Example 166 optionally includes wherein: the user preference input includes a sliding value between a minimum textile density value and a maximum textile density value; and means for determining the textile density value includes means for quantizing the sliding value to a quantized textile density value.

In Example 168, the subject matter of Example 167 optionally includes wherein: the minimum textile density value includes an associated Minimum voltage; and the maximum textile density value includes an associated maximum voltage, the minimum voltage and the maximum voltage determined based on the wearable adaptive fiber.

In Example 169, the subject matter of any one or more of Examples 163-168 optionally include means for adjusting the textile density of the wearable adaptive fabric in response to a location indication.

In Example 170, the subject matter of Example 169 optionally includes wherein the location indication is based on a location transition between an indoor location and an outdoor location.

In Example 171, the subject matter of any one or more of Examples 169-170 optionally include wherein the location indication is based on crossing a predetermined geo-fence, the predetermined geo-fence defining a virtual perimeter for a geographic area.

In Example 172, the subject matter of any one or more of Examples 163-171 optionally include means for adjusting the textile density of the wearable adaptive fabric in response to a sport activity indication.

In Example 173, the subject matter of Example 172 optionally includes wherein the sport activity indication is based on a sporting activity detected by a device sensor.

In Example 174, the subject matter of any one or more of Examples 163-173 optionally include means for adjusting the textile density of the wearable adaptive fabric in response to an electronic device weather indication.

In Example 175, the subject matter of any one or more of Examples 150-174 optionally include wherein the event-based trigger is received from a connected sensor.

In Example 176, the subject matter of Example 175 optionally includes wherein the connected sensor is embedded within the adaptive garment.

In Example 177, the subject matter of any one or more of Examples 175-176 optionally include wherein the connected sensor is in wireless communication with the adaptive garment.

In Example 178, the subject matter of any one or more of Examples 175-177 optionally include means for detecting a barometric pressure value means for generating a weather change indication based on the barometric pressure value; and means for adjusting the textile density of the wearable adaptive fabric in response to the weather change indication.

In Example 179, the subject matter of any one or more of Examples 175-178 optionally include means for detecting an electrical characteristic change of the user's skin; and means for adjusting the textile density of the wearable adaptive fabric in response to the electrical characteristic change.

In Example 180, the subject matter of Example 179 optionally includes wherein the electrical characteristic change indicates a user physical activity change.

In Example 181, the subject matter of any one or more of Examples 179-180 optionally include wherein the electrical characteristic change indicates a user emotional response.

In Example 182, the subject matter of Example 181 optionally includes wherein the emotional response includes at least one of a startle response, an orienting response, a fear emotion, and an anger emotion.

In Example 183, the subject matter of any one or more of Examples 181-182 optionally include wherein adjusting the textile density includes changing a shape of at least a portion of the adaptive garment.

In Example 184, the subject matter of any one or more of Examples 181-183 optionally include wherein adjusting the textile density includes relaxing at least a portion of the adaptive garment.

In Example 185, the subject matter of any one or more of Examples 175-184 optionally include means for detecting an athletic activity; and means for adjusting the textile density of the wearable adaptive fabric in response to the athletic activity change.

In Example 186, the subject matter of Example 185 optionally includes wherein the inertial measurement sensor includes at least one of an accelerometer, a gyroscope, and a magnetometer.

In Example 187, the subject matter of any one or more of Examples 185-186 optionally include the inertial measurement sensor further to detect an athletic activity level change, wherein adjusting the textile density includes changing a shape of at least a portion of the adaptive garment.

In Example 188, the subject matter of any one or more of Examples 175-187 optionally include wherein the connected sensor includes an external temperature sensor to detect an ambient temperature.

In Example 189, the subject matter of Example 188 optionally includes means for detecting an ambient temperature change; and means for adjusting the textile density in response to the increase in the ambient temperature change.

In Example 190, the subject matter of any one or more of Examples 188-189 optionally include wherein the connected sensor further includes a body temperature sensor to detect a body temperature.

In Example 191, the subject matter of Example 190 optionally includes means for determining a textile density differential temperature value based on the ambient temperature and the body temperature, wherein means for adjusting the textile density is based on the textile density differential temperature value.

In Example 192, the subject matter of any one or more of Examples 150-191 optionally include means for receiving a user input from a user input device, the garment including the user input device.

In Example 193, the subject matter of Example 192 optionally includes wherein the user input device includes a touch-sensitive input.

In Example 194, the subject matter of any one or more of Examples 192-193 optionally include wherein the user input device includes a Near-Field Communication tag reader.

In Example 195, the subject matter of any one or more of Examples 150-194 optionally include means for providing a status indicator to the user, the status indicator to provide a status feedback indication to the user.

In Example 196, the subject matter of Example 195 optionally includes wherein the status indicator is provided to the user via at least one of a display device, an indicator light, and a vibration feedback device.

In Example 197, the subject matter of any one or more of Examples 195-196 optionally include wherein the status feedback indication includes a trigger type indicator to indicate a trigger type associated with the textile density of the adaptive garment.

In Example 198, the subject matter of any one or more of Examples 195-197 optionally include wherein the status feedback indication includes a textile density indicator to indicate a textile density value.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. In the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. An adaptive fabric apparatus comprising:
an adaptive garment capable of changing a size of fabric micro holes to modify a textile density, the adaptive garment including wearable electroactive fibers that contract to increase the size of fabric micro holes in response to an applied voltage; and
an adaptive fiber interface to adjust the textile density of the adaptive garment in response to an event-based trigger by modifying a voltage level applied to at least a portion of the wearable electroactive fibers.

2. The apparatus of claim 1, wherein the event-based trigger includes a schedule indication.

3. The apparatus of claim 2, wherein:
the schedule indication is based on a scheduled event start time; and
the adaptive fiber interface adjusts the textile density at the scheduled event start time.

4. The apparatus of claim 2, wherein:
the schedule indication is based on a scheduled event duration; and
the adaptive fiber interface adjusts and retains the textile density during the scheduled event duration.

5. The apparatus of claim 1, wherein the event-based trigger includes a time-based indication.

6. The apparatus of claim 5, wherein the time-based indication is based on an elapsed time without the occurrence of an activity.

7. The apparatus of claim 1, wherein the adaptive fiber interface adjusting the textile density of the adaptive garment provides a reminder to a user of the adaptive garment of the event-based trigger.

8. The apparatus of claim 1, wherein the adaptive garment includes at least one wearable adaptive fiber and a plurality of non-adaptive textile fibers, the at least one wearable adaptive fiber to change shape in response to an applied adaptive fiber control input.

9. The apparatus of claim 1, further including an external device communication interface to communicate with an electronic device, wherein the event-based trigger is received from the electronic device.

10. The apparatus of claim 9, the adaptive fiber interface to adjust the textile density of the adaptive garment in response to a user preference input, the user preference input received on the electronic device from the user.

11. The apparatus of claim 9, the adaptive fiber interface to adjust the textile density of the adaptive garment in response to a location indication.

12. The apparatus of claim 1, further including a user input device to generate a user input.

13. An adaptive fabric method comprising:
receiving an event-based trigger at an adaptive garment worn by a user, the adaptive garment including wearable electroactive fibers capable of modifying a textile density of the adaptive garment by contracting in response to an applied voltage to increase a size of fabric micro holes; and
applying a voltage level to at least a portion of the wearable electroactive fibers to modify the textile density of the wearable adaptive fabric in response to the event-based trigger.

14. The method of claim 13, wherein the event-based trigger includes a schedule indication.

15. The method of claim 14, wherein:
the schedule indication is based on a scheduled event start time; and
the adaptive fiber interface adjusts the textile density at the scheduled event start time.

16. The method of claim 14, wherein:
the schedule indication is based on a scheduled event duration; and
the adaptive fiber interface adjusts and retains the textile density during the scheduled event duration.

17. The method of claim 13, wherein the event-based trigger is received from an electronic device.

18. The method of claim 17, further including adjusting the textile density of the wearable adaptive fabric in response to a user preference input, the user preference input received on the electronic device from the user.

19. At least one non-transitory machine-readable storage medium, comprising a plurality of instructions that, responsive to being executed with processor circuitry of a computer-controlled device, cause the computer-controlled device to:
receive an event-based trigger at an adaptive garment worn by a user, the adaptive garment including wearable electroactive fibers capable of modifying a textile density of the adaptive garment by contracting in response to an applied voltage to increase a size of fabric micro holes; and
apply a voltage level to at least a portion of the plurality of wearable electroactive fibers to modify the textile density of the wearable adaptive fabric in response to the event-based trigger.

20. The non-transitory machine-readable storage medium of claim 19, wherein the event-based trigger includes a schedule indication.

21. The non-transitory machine-readable storage medium of claim 20, wherein:
the schedule indication is based on a scheduled event start time; and
the adaptive fiber interface adjusts the textile density at the scheduled event start time.

22. The non-transitory machine-readable storage medium of claim 20, wherein:
the schedule indication is based on a scheduled event duration; and
the adaptive fiber interface adjusts and retains the textile density during the scheduled event duration.

23. The non-transitory machine-readable storage medium of claim 19, wherein the adaptive fiber interface adjusting the textile density of the adaptive garment provides a reminder to a user of the adaptive garment of the event-based trigger.

24. The non-transitory machine-readable storage medium of claim 19, wherein the event-based trigger is received from an electronic device.

25. The non-transitory machine-readable storage medium of claim 24, the instructions further causing the computer-controlled device to adjust the textile density of the wearable adaptive fabric in response to a user preference input, the user preference input received on the electronic device from the user.

* * * * *